United States Statutory Invention Registration [19]

[11] Reg. Number: H651

Davis et al. [43] Published: Jul. 4, 1989

[54] GAS PHASE PHOTOACOUSTIC DETECTOR FOR INFRARED SPECTROSCOPY

[75] Inventors: Dennis M. Davis; Lynn D. Hoffland, both of Edgewood, Md.; Mark G. Rockley, Stillwater, Okla.

[73] Assignee: The United States of America as represented by the Secretary of the Army, Washington, D.C.

[21] Appl. No.: 925,028

[22] Filed: Oct. 30, 1986

[51] Int. Cl.[4] ..... G01N 21/35

[52] U.S. Cl. ..... 250/343

*Primary Examiner*—Thomas H. Tarcza
*Assistant Examiner*—Linda J. Wallace
*Attorney, Agent, or Firm*—Anthony T. Lane; Harold H. Card, Jr.; Michael C. Sachs

[57] ABSTRACT

A photoacoustic detector includes an evaporation space for receiving an organic vapor. The space is bounded by a window which is transparent to infrared radiation. A spectrometer irradiates the space with infrared radiation through the window to heat the vapor and acoustically modulate it at a frequency corresponding to the frequency of the infrared radiation. The acoustic modulations are picked up by a microphone which produces a signal which is amplified and used to form a characteristic spectrum. In this way gases or liquid in the space between the infrared source and the window can be detected by examining changes in the spectrum.

6 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 8
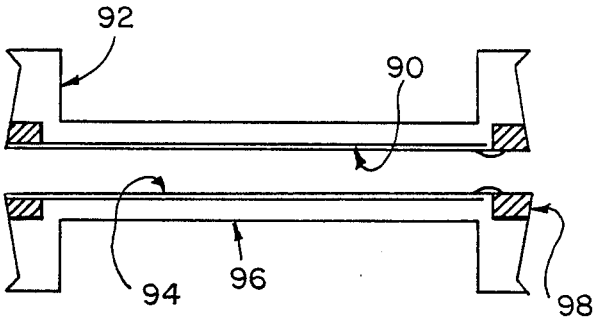
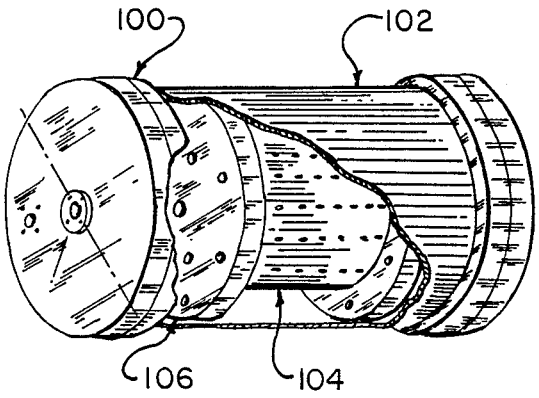
FIG. 9

GAS PHASE PHOTOACOUSTIC DETECTOR FOR INFRARED SPECTROSCOPY

STATEMENT OF GOVERNMENT INTEREST

The invention described herein may be manufactured, used and licensed by or for the Government for Governmental purposes without the payment to us of any royalties thereon.

FIELD AND BACKGROUND OF THE INVENTION

One of the major problems of interest in defending against chemical warfare is the detection of chemical agent contamination of the atmosphere. This problem has existed since chemical warfare was first used.

To this end the U.S. Army has developed a portable Fourier Transform Infrared Spectrometer which monitors the 8 to 12 micron region of the infrared spectrum. The spectrometer is designated the XM 21. The XM 21 currently uses a narrow band mercury cadmium telluride (MCT) detector. This MCT detector has a number of problems associated with its use in the XM 21. Among these problems are that the detector must operate at 77° K. using liquid nitrogen provided by a Stirling cooler. The Stirling cooler uses 20–30 watts of power. The MCT response curve also drops off sharply when not on the relatively narrow responsivity peak for the detector. In addition the current mean time between failures of the Stirling cooler is only 500 hours.

SUMMARY OF THE INVENTION

An object of the present invention is to provide a detector which avoids the various drawbacks of the MCT detector.

The present invention comprises a gas phase photoacoustic detector which has been fabricated and tested. Among the various advantages of the inventive photoacoustic (PAS) detector are the fact that it operates at ambient or near ambient temperatures. This eliminates the need for the Stirling cooler or any other refrigeration or cooling equipment.

The PAS detector uses less than one watt of power and has a responsivity curve which is constant across the 8 to 12 micron range. The theoretical detectivity of the PAS detector is approximately $3\times10^{12}$cm $Hz^{\frac{1}{2}}W^{-1}$. This is compared to the theoretical detectivity of $5\times10^{10}$cm $Hz^{\frac{1}{2}}W^{-1}$ for the MCT detector.

The mean time between failures of the photoacoustic detector is greater than six months.

The photodetector of the present invention comprises a high sensitivity Bruel and Kjaer Model 4129 microphone, a Bruel and Kjaer Model 2642 microphone preamplifier, a Bruel and Kjaer Model 2810 microphone power supply and the photoacoustic cell of the present invention. The microphone, preamplifier and power supply are all commercially available from the Bruel and Kjaer Company.

Accordingly a further object of the present invention is to provide a gas phase photoacoustic detector for infrared spectroscopy which comprises a housing defining an evaporation space, an acoustic modulation space and a passage extending between the evaporation and the modulation spaces, the housing having a port therein communicating with the evaporation space, an infrared radiation passing window providing a port for passing infrared radiation into the evaporation space, a receptacle for receiving a measured quantity of organic liquid, said receptacle being engaged with said housing for sealing the receptacle in the evaporation space so that the organic liquid evaporates into the evaporation space, the evaporating liquid passing through the passage and filling the modulation space, and means for attaching a microphone to the housing for exposing the microphone to the acoustic modulation space whereby infrared radiation passed through the window excites the evaporated liquid in the modulation space to produce an acoustic signal at the same modulation frequency as the incident infrared radiation, the acoustic modulation being picked up by the microohone to form a spectrum which is characteristic of the infrared radiation passing to and through the window.

A further object of the invention is to use a gas phase photoacoustic detector in combination with an infrared spectrometer to produce a characteristic absorption curve that can be used in detecting the presence of a chemical in the area surrounding the housing.

A still further object of the invention is to provide a photoacoustic detector which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is a schematic side sectional view of a double open ended organ pipe type of resonant microphone which can be used in the spectrophone of FIG. 6 and in accordance with the invention; and FIG. 9 is a perspective view, with portions cut away, of a radial mode spectrophone which can be used in accordance with the present invention.

DESCRIPTION OF THE PREFERRED EMBODIMENT

Figure 1:
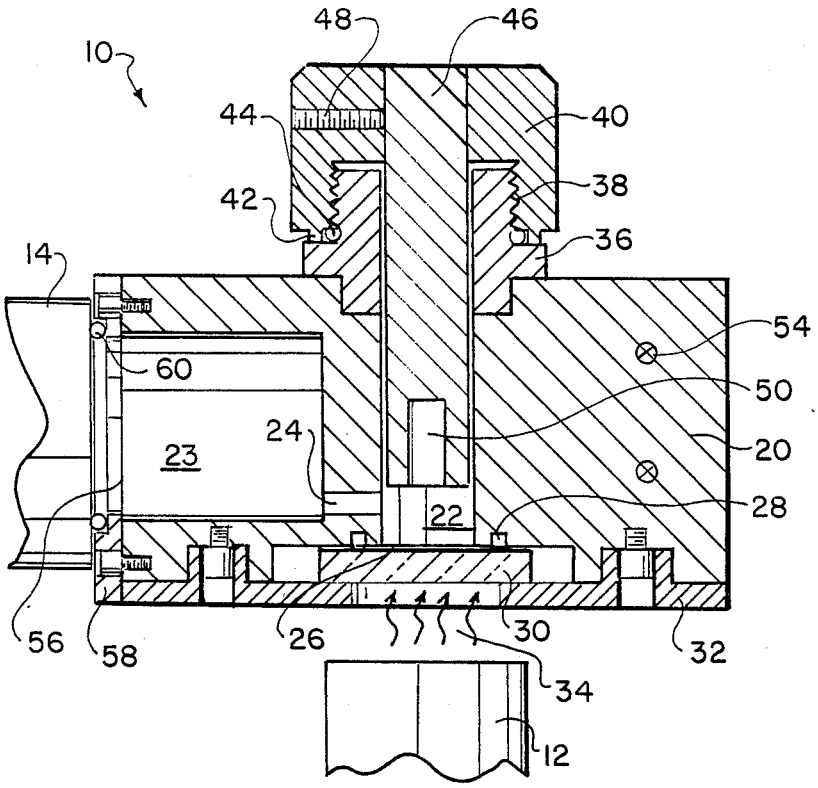
FIG. 1 is a side sectional view of a gas phase photoacoustic detector in accordance with the present invention.

Referring to the drawings in particular, the invention embodied in FIG. 1 comprises a gas phase photoacoustic detector generally designated 10 for use with an infrared spectrometer, such as a Fourier transform spectrometer shown partially and schematically at 12. The present invention is also used in conjunction with a highly sensitive microphone shown partially and schematically at 14.

The detector 10 includes a housing 20 having an evaporation space 22 and an acoustic modulation space 23. A passage 24 extends between and communicates the spaces 22 and 23.

Housing 20 has an irradiation port 26 which is surrounded by an O-ring 28 and which is covered by a zinc selenide (ZnSe) window 30. Window 30 is held against O-ring 28 by a bottom cover 32 in order to seal space 22 from the ambient. Infrared light 34 which is modulated by the Fourier transform spectrometer 12 enters space 22 through the ZnSe window 30. The zinc selenide is transparent to infrared radiation. The window can be replaced by any other transparent material which is suitably transparent to infrared radiation.

Housing 20 and bottom plate 32 are advantageously made of aluminum.

A shaft screw 36 is fixedly connected into an upper opening of housing 20 which communicates with space 22. Screw 36 is advantageously made of brass and has threads 38 onto which internal threads of a cap 40 are threaded. Cap 40 has a lower flange 42 which confines an O-ring 44 between cap 40 and screw 36. A receptacle 46 is fixed to cap 40, for example, by a set screw 48. The junction between receptacle 46 and cap 40 is hermetically sealed so that with cap 40 screwed on to screw 36, shaft 46 extends into space 22 and closes space 22 with respect to the ambient.

Receptacle 46 is advantageously in the form of an internal shaft made of stainless steel and having a blind bore 50 of a selected volume.

Figure 2:
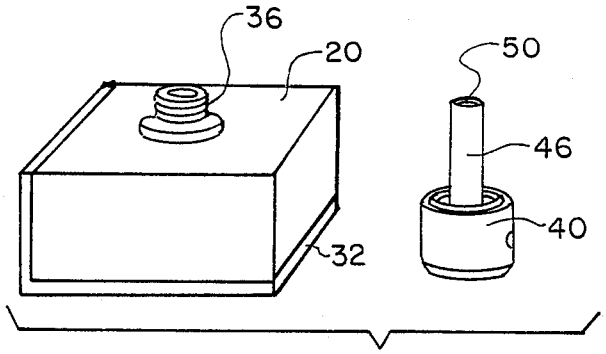
FIG. 2 is an exploded perspective view of the detector of FIG. 1 showing an organic liquid receptacle shaft to be filled with an organic liquid and to be engaged with a housing of the detector.

As shown in FIG. 2, cap 40 can act as a support for shaft 46 with its blind bore or receptacle space 50 in an upward position. In this position, receptacle space 50 can be filled with an organic liquid. Housing 20 can advantageously be heated, for example by a heatig coil shown schematically at 54, so as to evaporate the organic liquid in space 22. For sufficiently volatile organic liquids, little or no heating may be necessary.

Once evaporated, the vapors move through passage 24 and fill space 23. Spaces 22, 23 and passage 24 are thus filled with vapors.

Housing 20 also has a port 56, which opens into modulation space 32 and is surrounded by an opening in a front plate 58. An O-ring 60 surrounds the opening and can be engaged against the sound-receiving end of a microphone 14. In this way the microphone 14 is in an ideal position for picking up any acoustic signals from space 23.

According to the present invention, with housing 20 heated and a measure of organic liquid being deposited into and sealed within evaporation space 22 by cap 40 and shaft 46, infrared radiation entering through window 30 will be absorbed by the vapor and converted into heat. The conversion to heat is modulated at the same frequency as the infrared light 34. This periodic or modulated heating causes pressure fluctuations at the modulation frequency in the spaces 22 and 23. The pressure fluctuations are then detected by the microphone 14. The microphone 14 includes a preamplifier and power supply to produce an amplified output signal which is input into signal processing hardware and software (of conventional design) used by the spectrometer.

The sealed volume of the space 23 can also contain a carrier gas such as helium, nitrogen or air.

A mixture of several other gases which exhibit high extinction coefficients in the 8–12 micrometer range can also be used. These vapors are provided by the liquid supplied to the receptacle space 50 and ultimately discharged into the evaporation space 22.

Unlike the present invention, conventional photoacoustic cells are used to detect gases, liquids or solids which are present in the photoacoustic cell itself. According to the present invention, absorption of infrared radiation by gases, liquids or solids outside the detector housing 20 can be detected. Actual experiments have demonstrated the utility of the inventive photoacoustic (PAS) detector.

Figure 3:
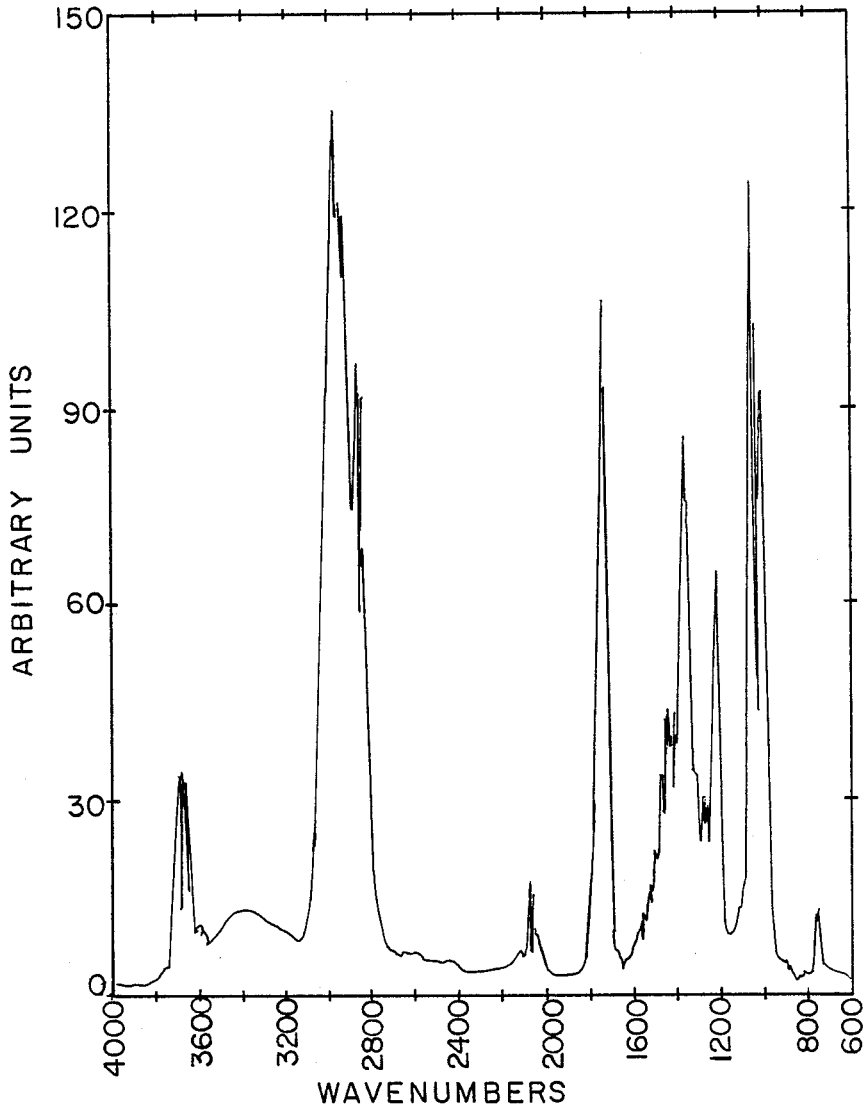
FIG. 3 is a curve showing a single beam spectrum of a mixture of acetone and methanol vapors generated by a Fourier transform infrared spectroscope used with the photoacoustic detector of the present invention.

In such an experiment, the receptacle space 50 was filled with methanol and acetone and cap 40 was engaged with and sealed onto the housing 20. The methanol and acetone vapors were at room temperature and filled the spaces 22–23 and 24 in housing 20. With infrared irradiation through window 30, using a Fourier transform spectrometer, the spectrum of FIG. 3 was obtained. Of primary interest is the strong absorption between 1,100 and 900 wavenumbers. This is because phosphoryl containing chemical agents have strong absorptions in this region. These represent a large number of chemicals used in chemical warfare. This strong absorption between 1,100 and 900 wavenumbers can be smoothed and broadened to extend from 800 to 1,300 wavenumbers by adding volatile ethers and esters to the mixture in the housing 20.

Figure 4:
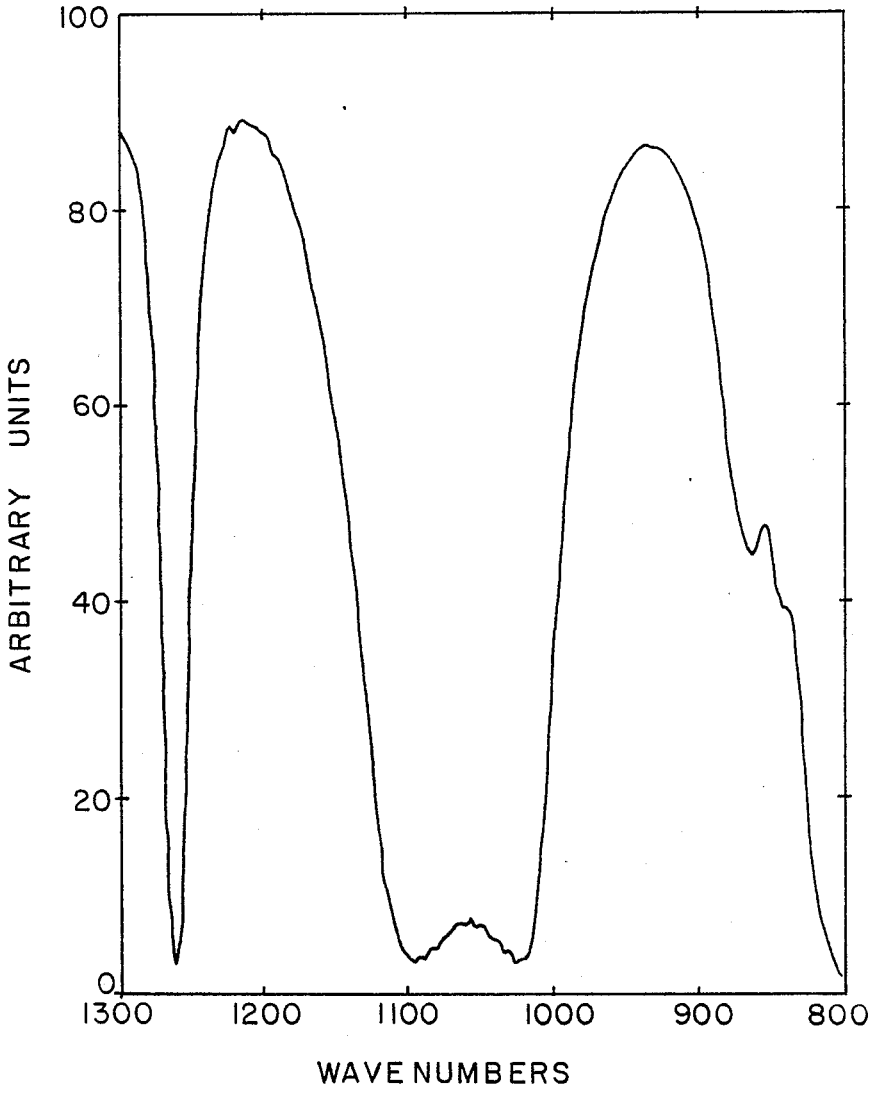
FIG. 4 is a curve representing an infrared transmission spectrum of a chemical to be detected using a conventional MCT detector.
Figure 5:
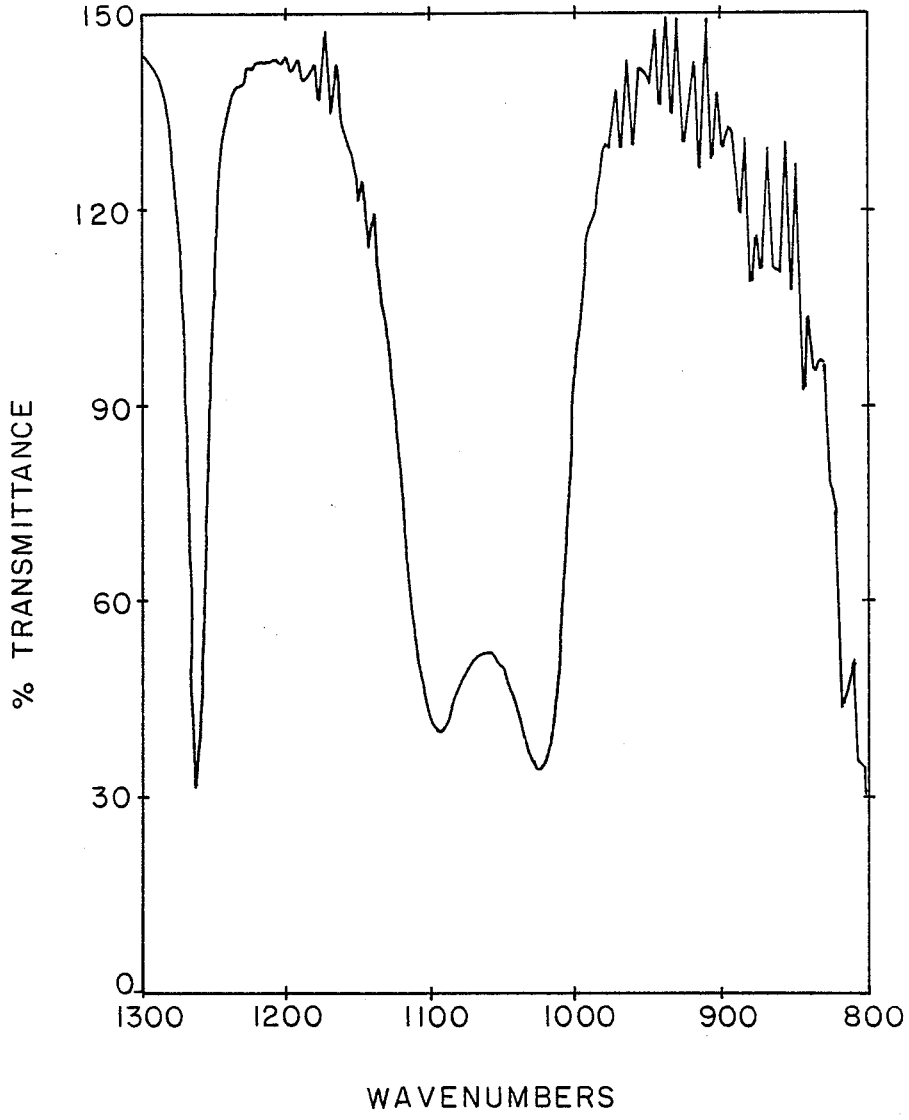
FIG. 5 is a graph showing the infrared transmission spectrum for the same compound as in FIG. 4 but using the photoacoustic transducer of the present invention.

After obtaining the spectrum of the acetone-methanol vapor, a thin film of a chemical agent simulant (SF-96) was spread over the outside of window 30 and the transmission spectrum was recorded using both conventional MCT and the inventive PAS detectors. The spectrum recorded using the MCT detector is shown in FIG. 4 and the spectrum using the inventive PAS detector is shown in FIG. 5.

The two spectra are the same with the exception of the noise level in the 1,225–1,137 and 975–850 wavenumber regions of the spectra. Again, the noise level in these regions of the PAS spectrum can be reduced by adding other gases, such as volatile ethers and esters, to the PAS evaporation space 22.

Other designs which are in conformance with the present invention are applicable in building a high sensitivity photoacoustic detector. These designs, which are shown in FIGS. 6–9, described by Charles Bruce in Research and Development Technical Report ECOM-5802 entitled, "Development of Spectrophones for CW and Pulsed Radiation Sources", include spectrophone and microphone designs of the radial mode spectrophone (FIG. 9), the double open ended organ pipe resonant microphone (FIG. 8), and the cylindrical microphone (FIG. 7). Either the double ended organ pipe resonant microphone or the cylindrical microphone of FIGS. 8 or 7 can be employed in the resonant chamber of a resonant acoustic spectrophone (shown in FIG. 6) and the radial mode spectrophone (shown in FIG. 9). Capacitance microphone diaphragms (known in themselves) are used in the microphone.

Figure 6:
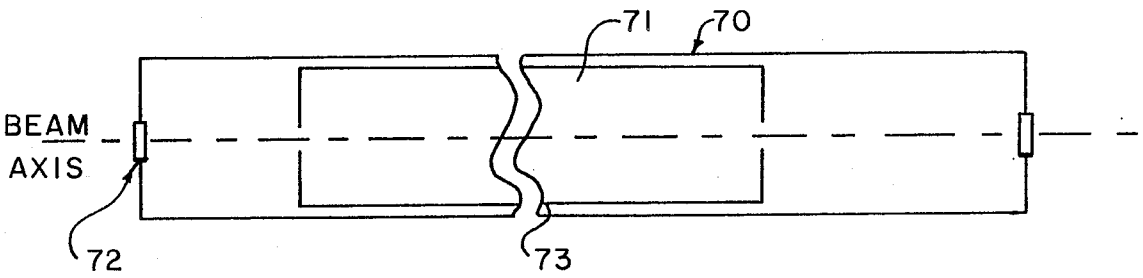
FIG. 6 is a schematic side sectional view of a resonant acoustical spectrophone which can be used in accordance with the present invention.
Figure 7:
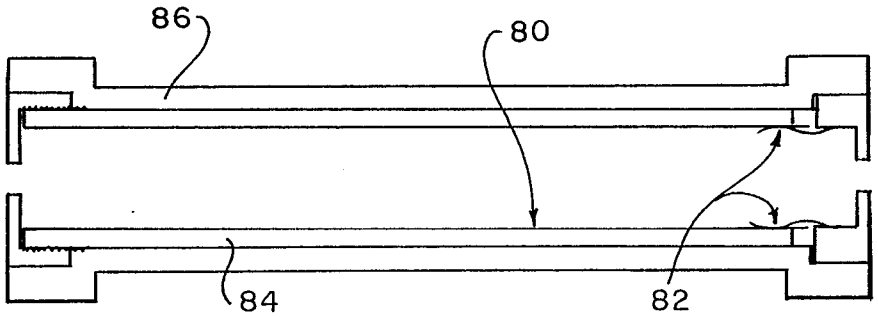
FIG. 7 is a schematic side sectional view showing components of a cylindrical microphone which can be used in the spectrophone of FIG. 6 and in accordance with the present invention.

As shown in FIG. 6, the resonant acoustical spectrophone comprises an outer cylinder 70 having a space 71 and a window 72. An infrared light beam passes through window 72 and space 71 on a beam axis. An inner cylinder 73 forms the resonant chamber around space 71.

The microphones of FIGS. 7 or 8 can be inserted into space 71. FIG. 7 shows a cylindrical microphone having a microphone diaphragm 80, which for example can be a capacitance microphone diaphragm. The diaphragm carries printed-on electrodes which can be contacted by nickel-plated brass contact clips 82. The diaphragm also includes a nickel plated brass or SS cylinder 84 which supports as engaged behind the diaphragm 80. An outer Teflon carrier cylinder 86 supports the cylinder 84.

As shown in FIG. 8, a double open ended organ pipe type resonator includes a cylindrical Mylar diaphragm 90 in the proximity of the inner wall of a cylindrical carrier 92 which, for example, is made of Teflon (a trade name). Diaphragm 90 is pressed outwardly against carrier 92 by a stainless steel tube 94. Wall 96 of carrier 92 is perforated.

Metallic contact locks 98 are also pressed into opposite ends of carrier 92 for mounting against opposite end walls of chamber 73 in FIG. 6 or and walls of the spectroscope in FIG. 9.

Turning to FIG. 9, the spectroscope shown therein comprises a Teflon O-ring 100 and a stainless steel casing 102. The stainless steel microphone 104 is shown within the casing 102. Teflon microphone mounts 106 are used to carry microphone 104 in the spectrophone.

While a specific embodiment of the invention has been shown and described in detail to illustrate the application of the principles of the invention, it will be understood that the invention may be embodied otherwise without departing from such principles.

What is claimed is:

1. A gas phase photoacoustic detector for infrared spectroscopy comprising:

a housing defining an evaporation space, a modulation space and a passage extending between the evaporation and modulation spaces, said housing having a first exterior port communicating with the evaporation space and a second exterior port communicating with the modulation space;

a window which is substantially transparent to infrared radiation connected to said housing and covering said first exterior port to seal the evaporation space;

receptacle means for carrying a measured quantity of an evaporatable organic liquid and for depositing the liquid into the evaporation space, said receptacle means being engaged with said housing for sealing the evaporation space closed; and microphone mounting means engaged over said second exterior port for bringing an acoustic receiving portion of a microphone into acoustic association with the modulation space so that when infrared radiation passes through said window and is absorbed by organic vapors in said evaporation space, pressure fluctuations are formed at a frequency of modulation of the infrared radiation to produce acoustic modulations in the modulation space which can be sensed by a microphone connected to said microphone mounting means to form a characteristic spectrum, the characteristic spectrum being changed by substances outside the window through which the infrared radiation passes.

2. A detector according to claim 1 wherein the evaporation space comprises a bore extending through said housing, said first exterior port being at one end of said bore, said housing having a third exterior port at an opposite end of said bore, a shaft screw fixed to said housing at said third external port, said receptacle means comprising a shaft with a blind bore at one end, a cap connected to said shaft at an opposite end and having threads for engaging said shaft screw with said shaft in the evaporation space.

3. A detector according to claim 2 wherein said modulation space comprises a blind opening extending perpendicularly to said bore which forms the evaporation space, said passage comprising a small diameter opening through said housing extending radially to said evaporation space and axially parallel with said modulation space.

4. A detector according to claim 3 wherein said window is made of zinc selenide.

5. A detector according to claim 1 including a microphone connected to said microphone mounting means, said microphone comprising a cylindrical diaphragm extending around said evaporation space.

6. A detector according to claim 5 wherein said microphone includes a cylindrical carrier carrying said diaphragm and having opposite open ends through which a beam of infrared radiation entering through said window passes.

* * * * *